(12) United States Patent
Yoshida (10) Patent No.: US 10,754,202 B2
(45) Date of Patent: Aug. 25, 2020

(54) LIQUID CRYSTAL PANEL

(71) Applicant: SHARP KABUSHIKI KAISHA, Sakai, Osaka (JP)

(72) Inventor: Kazuko Yoshida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/354,151

(22) Filed: Mar. 14, 2019

(65) Prior Publication Data
US 2019/0294008 A1 Sep. 26, 2019

(30) Foreign Application Priority Data
Mar. 22, 2018 (JP) .................. 2018-054111

(51) Int. Cl.
| | | |
|---|---|---|
| *G02F 1/136* | (2006.01) | |
| *G02F 1/1337* | (2006.01) | |
| *G02F 1/1368* | (2006.01) | |
| *G02F 1/1339* | (2006.01) | |
| *G02F 1/1343* | (2006.01) | |

(52) U.S. Cl.
CPC ...... *G02F 1/133711* (2013.01); *G02F 1/1339* (2013.01); *G02F 1/1368* (2013.01); *G02F 1/134309* (2013.01); *G02F 2201/121* (2013.01); *G02F 2201/123* (2013.01)

(58) Field of Classification Search
None
See application file for complete search history.

(56) References Cited

U.S. PATENT DOCUMENTS

2008/0018848 A1\* 1/2008 Iwato ................ G02F 1/133711
349/149

FOREIGN PATENT DOCUMENTS

JP 2005-181795 A 7/2005

\* cited by examiner

*Primary Examiner* — James A Dudek
(74) *Attorney, Agent, or Firm* — ScienBiziP, P.C.

(57) ABSTRACT

A liquid crystal panel includes a pair of substrates, a liquid crystal layer, and a sealant. The liquid crystal layer is disposed between the substrates. The sealant is disposed at edges of the substrates to seal the liquid crystal layer. At least one of the substrates includes an alignment film and a high wettability section. The alignment film is for aligning liquid crystal molecules in the liquid crystal layer. The high wettability section is in contact with the liquid crystal layer between outer edges of the alignment film and the sealant. The high wettability section has wettability greater than wettability of the alignment film.

9 Claims, 5 Drawing Sheets

LIQUID CRYSTAL PANEL

CROSS REFERENCE TO RELATED APPLICATION

This application claims priority from Japanese Patent Application No. 2018-054111 filed on Mar. 22, 2018. The entire contents of the priority application are incorporated herein by reference.

TECHNICAL FIELD

The technology described herein relates to a liquid crystal panel.

BACKGROUND

A liquid crystal panel includes a pair of substrates, a liquid crystal layer disposed between the two substrates, and a seal, provided at peripheral edges of the pair of substrates, that seals in the liquid crystal layer. A liquid substance such as water may undesirably enter the liquid crystal panel, i.e. the liquid crystal layer, due to external infiltration, separation of an uncured component of a seal material, or the like. If an alignment film made of an inorganic material absorbs the liquid, alignment performance may be reduced. To maintain the alignment performance of the alignment film, an absorbent layer for absorbing the liquid may be provided in an upper layer relative to a layer in which the alignment film is provided between a display area and a sealant.

However, many alignment films are made of organic materials. Such an alignment film, an insulating film on a substrate surface, and a liquid crystal material may have relatively low wettability, that is, have great angles of contact. Accordingly, in the alignment film, the insulating film, and the liquid crystal material, a liquid substance turns into subglobular form (liquid bubble). When a liquid substance having turned into such a liquid bubble may move through the inside of the liquid crystal layer to penetrate into the display area. Then, once the liquid bubble penetrates into the display area, the liquid bubble disrupts the orientation of liquid crystals to cause display defects such as display irregularities and minute bright spots. In particular, in many cases of thermal shock testing, which is reliability testing on liquid crystal panels, expansion and contraction of the liquid crystal panels cause liquid bubbles to move to penetrate into the display areas. Further, the liquid crystal panel disclosed in Japanese Unexamined Patent Application Publication No. 2005-181795 makes it necessary that in the step of fabricating a substrate of the liquid crystal panel, the step of forming an alignment film be followed by an additional step of forming an absorbent layer.

SUMMARY

The technology described herein was made in view of the above circumstances. An object is to provide a liquid crystal panel in which a liquid substance is less likely to enter a display area with a relatively simple process.

A liquid crystal panel according to the technology described herein includes a pair of substrates, a liquid crystal layer disposed between the substrates, and a sealant. The sealant is disposed at edges of the substrates to seal the liquid crystal layer. At least one of the substrates includes an alignment film and a high wettability section. The alignment film is for aligning liquid crystal molecules in the liquid crystal layer. The high wettability section is in contact with the liquid crystal layer between outer edges of the alignment film and the sealant. The high wettability section has wettability greater than wettability of the alignment film.

According to the liquid crystal panel having such a configuration, the high wettability section having the wettability greater than the wettability of the alignment film absorbs the liquid substance. Therefore, a bubble produced from the liquid is less likely to enter a display area, as the liquid substance can be adsorbed by the high wettability section, which is higher in wettability than the alignment film. Further, the liquid crystal panel may include a component configured as the high wettability section between the alignment film and the sealant. Alternatively, the liquid crystal panel may be configured such that a section of a layer having higher wettability outside the display area may be exposed without being covered with the alignment film to function as the high wettability section. According to the configuration in which the high wettability section is separately formed, the high wettability section can be formed simultaneously with another step prior to a step of forming the alignment film. Therefore, the liquid crystal panel in which the liquid substance is less likely to enter the display area can be produced in a relatively simple process.

According to the technology described herein, a liquid crystal panel in which a liquid substance is less likely to enter a display area is provided with a relatively simple process.

DETAILED DESCRIPTION

As modes for carrying out the technology described herein, some embodiments of the technology described herein are described in detail below with reference to the drawings. It should be noted that the technology described herein is not limited to the embodiments described below but may be carried out in various modes with various alterations and improvements based on the knowledge of persons skilled in the art.

First Embodiment

Figure 1:
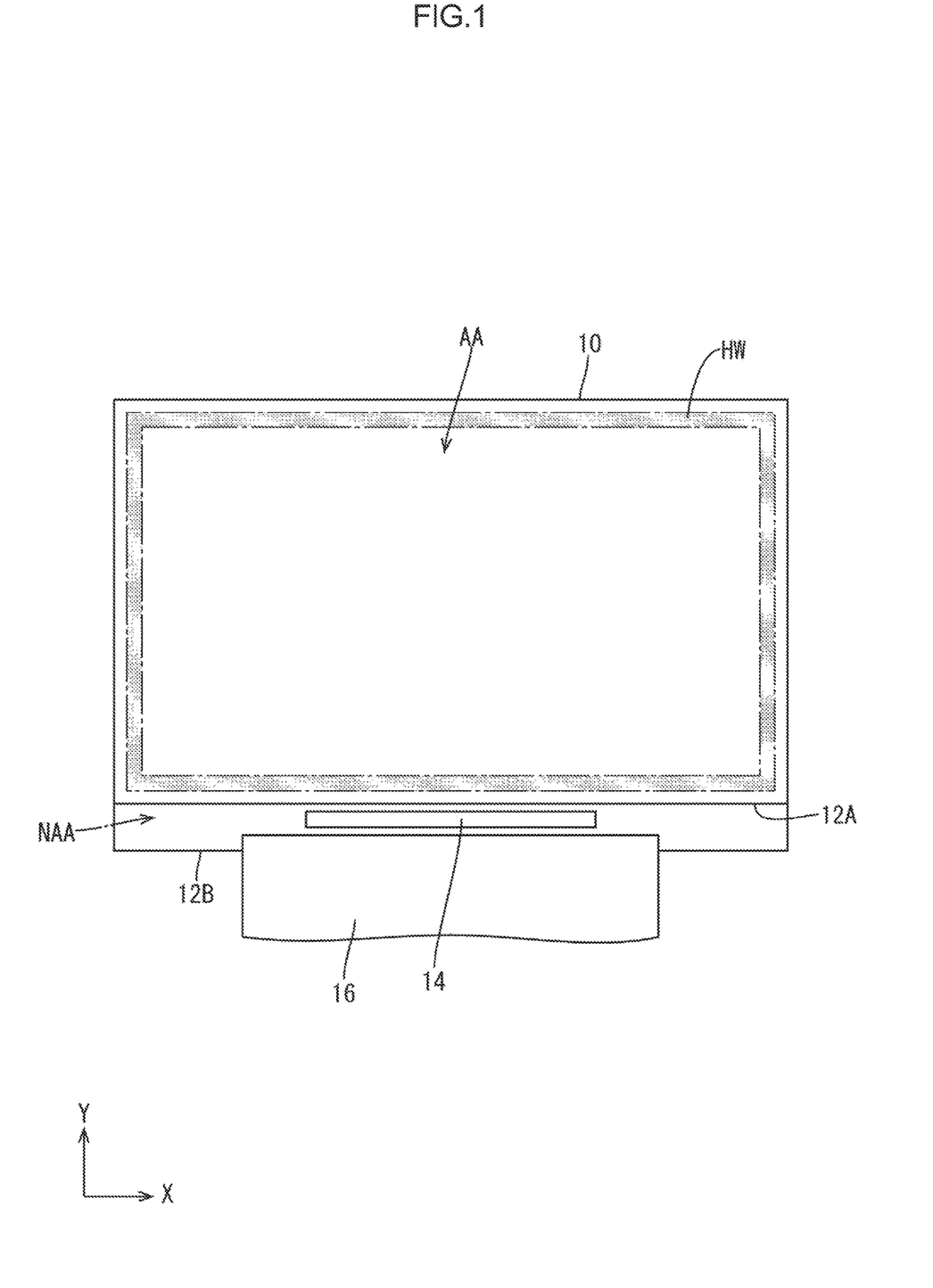
FIG. 1 is a plan view of a liquid crystal panel according to a first embodiment.

A liquid crystal panel 10 according to a first embodiment is described with reference to FIGS. 1 and 2. The liquid crystal panel 10 has a horizontally long rectangular shape. As shown in FIG. 1, the liquid crystal panel 10 has a display surface divided into a display area (active area) AA where an image is displayed and a non-display area (non-active area) NAA where no image is displayed. The non-display area NAA has a frame shape that surrounds the display area AA. Incidentally, in FIG. 1, the display area AA has its outside shape represented by inner dot-and-dash lines, and the non-display area NAA is a region that lies outside the inner dot-and-dash lines.

Figure 2:
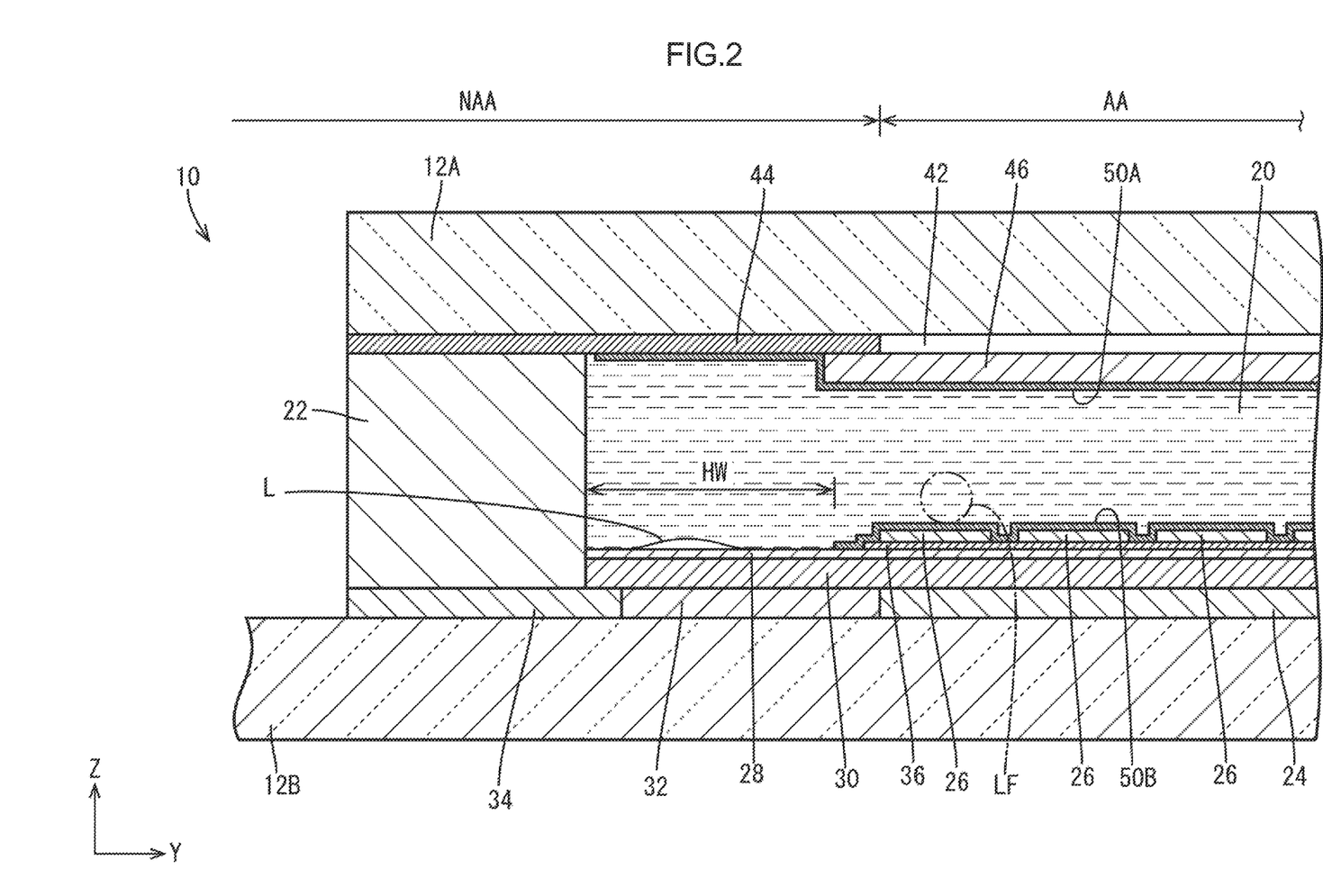
FIG. 2 is a cross-sectional view of the liquid crystal panel according to the first embodiment.

As shown in FIG. 2, the liquid crystal panel 10 includes a pair of substrates 12, bonded to each other, that consist of a CF substrate (counter substrate) 12A disposed at the front (front face side) and an array substrate (display device substrate, active matrix substrate) 12B disposed at the back (rear face side). The CF substrate 12A and the array substrate 12B each include a substantially transparent glass substrate and films joined on top of each other over the glass substrate by a known photolithographic method. Among these, the array substrate 12B is larger in size than the CF substrate 12A and has a part that projects laterally from the CF substrate 12A, and the projecting part (which constitutes the non-display area NAA) is mounted with a driver (panel driving component) 14 and a flexible substrate (signal transmitting member) 16 that serve as components for supplying various types of signal. The driver 14 includes an LSI chip having a driving circuit inside, is mounted on the array substrate 12B by means of COG (chip on glass), and processes various types of signal that are transmitted by the flexible substrate 16. The flexible substrate 16 includes an insulative and flexible base material and a large number of wiring patterns formed on the base material and, by being connected to the array substrate 12B of the liquid crystal panel 10 and a control substrate (signal supply source; not illustrated), transmits, to the liquid crystal panel 10, various types of signal that are outputted from the control substrate.

Interposed between the two substrates 12A and 12B opposed to each other are a liquid crystal layer 20 containing liquid crystal molecules that constitute a substance which exhibits a change in optical property in the presence of the application of a voltage and a sealant 22 for sealing in the liquid crystal layer 20. The sealant 22 is disposed at outer peripheral ends of the non-display area NAA between the two substrates 12A and 12B, is provided in such a manner as to extend all along the outer peripheral ends, and has a rectangular frame shape (endless ring shape) in a plan view (see FIG. 1). The sealant 22 causes a gap (cell gap) corresponding in thickness to the liquid crystal layer 20 to be retained at the outer peripheral ends of the two substrates 12A and 12B. Further, although not illustrated, a spacer for retaining the cell gap is disposed between the two substrates 12A and 12B in the display area AA.

Next, an internal structure of the liquid crystal panel 10 is described with reference to FIG. 2. It should be noted various parts of the internal structure are illustrated in a simplistic form. A pixel circuit section 24, pixel electrodes 26, and a common electrode 28 are disposed in the display area AA so as to face an inner surface of the array substrate 12B, and a peripheral circuit section (circuit section) 32 and a wire connection section 34 are disposed in the non-display area NAA so as to face the inner surface of the array substrate 12B. Although not illustrated in detail, the pixel circuit section 24 includes pixels arranged in a matrix, gate wires (scanning wires) through which scanning signals are transmitted, source wires (signal wires) through which image signals are transmitted, and TFTs (thin-film transistors) serving as switching elements that are connected to the gate wires and the source wires. The gate wires each include a metal film (first metal film; Ag, Al, Cu, Ti, Mo, or the like or an alloy or laminate film thereof) and extend along an X-axis direction, and a large number of these gate wires are placed at intervals along a Y-axis direction. The source wires each include a metal film (second metal film, which may be made of the same material as the first metal film) disposed over a corresponding one of the gate wires with a gate insulating layer sandwiched therebetween and extend along the Y-axis direction, and a large number of these source wires are placed at intervals along the X-axis direction. The TFTs are each a known component having a channel section including a semiconductor film, and are each connected to a corresponding one of the pixel electrodes 26. The TFTs are driven in accordance with the scanning signals, which are transmitted through the gate wires, supply the image signals, which are transmitted through the source wires, to the pixel electrodes 26 via the channel sections, and charge the pixel electrodes 26 to predetermined potentials. The TFTs and the pixel electrodes 26 are disposed in regions surrounded by the gate wires and the source wires, and a large number of these TFTs and a large number of these pixel electrodes 26 are arranged in a matrix along the X-axis direction and the Y-axis direction.

The pixel electrodes 26 and the common electrode 28 include transparent electrode films of ITO, IZO, or the like, and it is assumed here that they include IZO films. The pixel electrodes 26 are disposed over the common electrode 28 with an inter-transparent electrode insulating film (interlayer insulating film) 36 sandwiched therebetween. The common electrode 28 is continuously formed to overlap the pixel electrodes 26 and is supplied with a substantially constant reference potential at least during image display, and between the common electrode 28 and each of the pixel electrodes 26, a potential difference based on the potential to which that pixel electrode 26 has been charged is applied. Each of the pixel electrodes 26 has one or more slits measuring for example 2 to 5 μm in width, and an electric field that is generated on the basis of the potential difference between the common electrode 28 and that pixel electrode 26 includes a fringe field (oblique field) including a component having a direction along a plate surface of the array substrate 12B and a component having a direction normal to the plate surface of the array substrate 12B. Therefore, the liquid crystal panel 10 is in a so-called FFS (fringe field switching) mode in which the state of orientation of the liquid crystal molecules contained in the liquid crystal layer 20 is controlled with a fringe field.

The peripheral circuit section 32 includes a circuit that supplies signals to the gate wires and the source wires, a circuit that supplies signals for checking for defects in the display region AA, and a circuit for countermeasure against static electricity, and is composed of circuit elements and the like such as wires including the same metal film as the gate wires and the source wires and TFTs including the same semiconductor film as the channel sections. The peripheral circuit section 32 is disposed to be substantially all around the display area AA on every side. Further, as shown in FIG. 2, the peripheral circuit section 32 is disposed in the non-display area NAA so as to be closer to the inside (closer to the display area AA) than the sealant 22, and is disposed not to overlap the sealant 22 in a plan view. It should be noted that the peripheral circuit section 32 is connected to the driver 14, the flexible substrate 16, and the like by connecting wires (not illustrated), respectively, provided in the non-display area NAA of the array substrate 12B.

The wire connection section 34 is a wiring region for connecting the wires and source wires of the peripheral circuit section 32 to the driver 14, the flexible substrate 16, and the like, and includes a part connected to connecting wires including another layer of a metal film. The wire connection section 34 has contact holes (not illustrated), bored through each insulating film disposed between metal films, via which wires are connected to each other. The wire connection section 34 is disposed in the non-display area NAA so as to be closer to the outside than the peripheral circuit section 32. The wire connection section 34 is disposed to mostly overlap the sealant 22 in a plan view.

An insulating film (planarizing film) 30 is provided over the pixel circuit section 24, the peripheral circuit section 32, and the wire connection section 34 in the array substrate 12B. The insulating film 30 is provided in substantially solid fashion over the entire range of an inner part of the array substrate 12B surrounded by the sealant 22. The insulating film 30 is made of an organic material such as acrylic resin (such as PMMA), and functions to planarize a difference in level having occurred under the insulating film 30. The insulating film 30 covers the pixel circuit section 24, the peripheral circuit section 32, and the wire connection section 34 from above. Moreover, the pixel electrodes 26 and the common electrode 28, which have been described earlier, are disposed over the insulating film 30. Incidentally, the insulating film 30 has contact holes (not illustrated), bored therethrough, via which the pixel electrodes 26 and the like are connected to the pixel circuit section 24 in the display area AA.

Next, an internal structure of the CF substrate 12A is described. In the display area AA facing an inner surface of the CF substrate 12A, a color filter 42 is provided in a position that overlaps each pixel electrode 26. The color filter 42 has an arrangement of three colors, namely red, green, and blue, that repeatedly alternate along the X-axis direction, that extend along the Y-axis direction, and that are thereby arrayed in stripes as a whole. In order to prevent a mixture of colors by partitioning adjacent color filters 42 from each other, a light-shielding section (black matrix) 44 is provided on the inner surface of the CF substrate 12A so as to extend over a range lying astride the display area AA and the non-display area NAA. In the display area AA, the light-shielding section 44 is in gridlike fashion to overlap the gate wires and the source wires, and in the non-display area NAA, the light-shielding section 44 is in solid fashion to overlap the peripheral circuit section 32. Formed over the color filter 42 and the light-shielding section 44 is an overcoat film (counter insulating film) 46. The overcoat film 46 is provided in substantially solid fashion over the entire range of an inner part of the CF substrate 12A surrounded by the sealant 22. As with the insulating film 30, the overcoat film 46 is made of an organic material such as acrylic resin (such as PMMA), and functions to planarize a difference in level having occurred under the overcoat film 46.

Innermost surfaces of the two substrates 12A and 12B that are in contact with the liquid crystal layer 20 are provided with a CF-side alignment film (counter alignment film) 50A and an array-side alignment film (alignment film) 50B for aligning the liquid crystal molecules contained in the liquid crystal layer 20, respectively. The CF-side alignment film 50A and the array-side alignment film 50B are both made, for example, of polyimide, which is an organic material. The CF-side alignment film 50A is disposed over the overcoat film 46, and entirely covers the overcoat film 46 from above in at least the display area AA. In FIG. 2, the CF-side alignment film 50A is provided in solid fashion over substantially the entire range of an inner part surrounded by the sealant 22. Further, the array-side alignment film 50B is disposed over the pixel electrodes 26, and entirely covers the pixel electrodes 26 from above in at least the display area AA.

Moreover, the liquid crystal panel 10 according to the first embodiment is characterized in the structure of the array substrate 12B. As described above, the array substrate 12B is structured such that the pixel circuit section 24, the peripheral circuit section 32, and the wire connection section 34 are disposed to face the inner surface of the array substrate 12B, that the insulating film 30 is provided over the pixel circuit section 24, the peripheral circuit section 32, and the wire connection section 34 in substantially solid fashion over the entire range of the inner part surrounded by the sealant 22, and that the common electrode 28 is provided over the insulating film 30. The common electrode 28 is provided not only in the display area AA but also over the entire range of the inner part surrounded by the sealant 22. On the other hand, the array-side alignment film 50B provided over the common electrode 28 to cover the interlayer insulating film 36 and the pixel electrodes 26 is confined to such a minimum range as to be able to cover the interlayer insulating film 36 and the pixel electrodes 26, and is not extended to the non-display area NAA. That is, the common electrode 28 is configured to make contact with the liquid crystal layer 20 in a range from the outer edges of the array-side alignment substrate 50B to the inner sides of the sealant 22. Although not illustrated or described in detail, the array-side alignment film 50B is formed in a limited range with a variety of methods (e.g. including forming the film by a printing method) that have conventionally been studied, as the array-side alignment film 50B is a material that is high in fluidity in a film forming step.

The common electrode 28 is an IZO film that is a transparent conductive film, and is higher in wettability and, in other words, has a lower angle of contact than the array-side alignment film 50B made of an organic material. That is, a part of the common electrode 28 that extends from the outer edges of the array-side alignment film 50B to the inner sides of the sealant 22 (i.e. the hatching region in FIG. 1) functions as a high wettability section HW, and the high wettability section HW extends all along the inner sides of the sealant 22.

In general, the alignment films substantially entirely cover the inner part surrounded by the sealant 22. In such a case, once a liquid substance such as water enters the liquid crystal layer 20, the liquid substance having entered turns into a liquid bubble LF in the liquid crystal layer 20, as the alignment films and the liquid crystal material are comparatively low in wettability. The liquid bubble LF easily moves through the inside of the liquid crystal layer 20. For example, as indicated by a chain double-dashed line in FIG. 2, once the liquid bubble LF reaches the display area AA, the liquid bubble LF disrupts the orientation of liquid crystals to cause display defects such as display irregularities and minute bright spots. In particular, in many cases of thermal shock testing, which is reliability testing on liquid crystal panels, expansion and contraction of the liquid crystal panels cause liquid bubbles LF to move to penetrate into the display areas AA.

On the other hand, since the liquid crystal panel 10 is provided with the aforementioned high wettability section HW, the liquid substance L is adsorbed into the high wettability section HW as shown in FIG. 2. Moreover, since the high wettability section HW is provided all around the display area AA, comparatively more of the liquid substance L can be adsorbed, and the liquid crystal panel 10 makes it possible to prevent the liquid substance L from penetrating into the display area AA. Further, since a process for manufacturing the liquid crystal panel 10 is only different from a process for manufacturing a conventional liquid crystal panel in terms of the ranges of formation of the common electrode 28 and the array-side alignment film 50B of the array substrate 12B, it is possible to easily form the high wettability section HW.

In the configuration described above, the pixel electrodes 26 are disposed over the common electrode 28. Alternatively, the opposite may be true. That is, the pixel electrodes 26 may be disposed under the common electrode 28 with the interlayer insulating film 36 sandwiched therebetween. In this case, the common electrode 28 continuously formed to overlap the pixel electrodes 26 has one or more slits, formed in correspondence with each of the pixel electrodes 26, that measure for example 2 to 5 μm in width. Further, instead of being made of an organic material, the insulating film 30 may be made of an inorganic material such as silicon dioxide ($SiO_2$) or silicon nitride ($SiN_x$) or may be a laminate of an organic material and an inorganic material. Furthermore, the interlayer insulating film 36 and the insulating film 30 may be a common film. That is, the insulating film 30 may be omitted from the configuration shown in FIG. 2.

Second Embodiment

Figure 3:
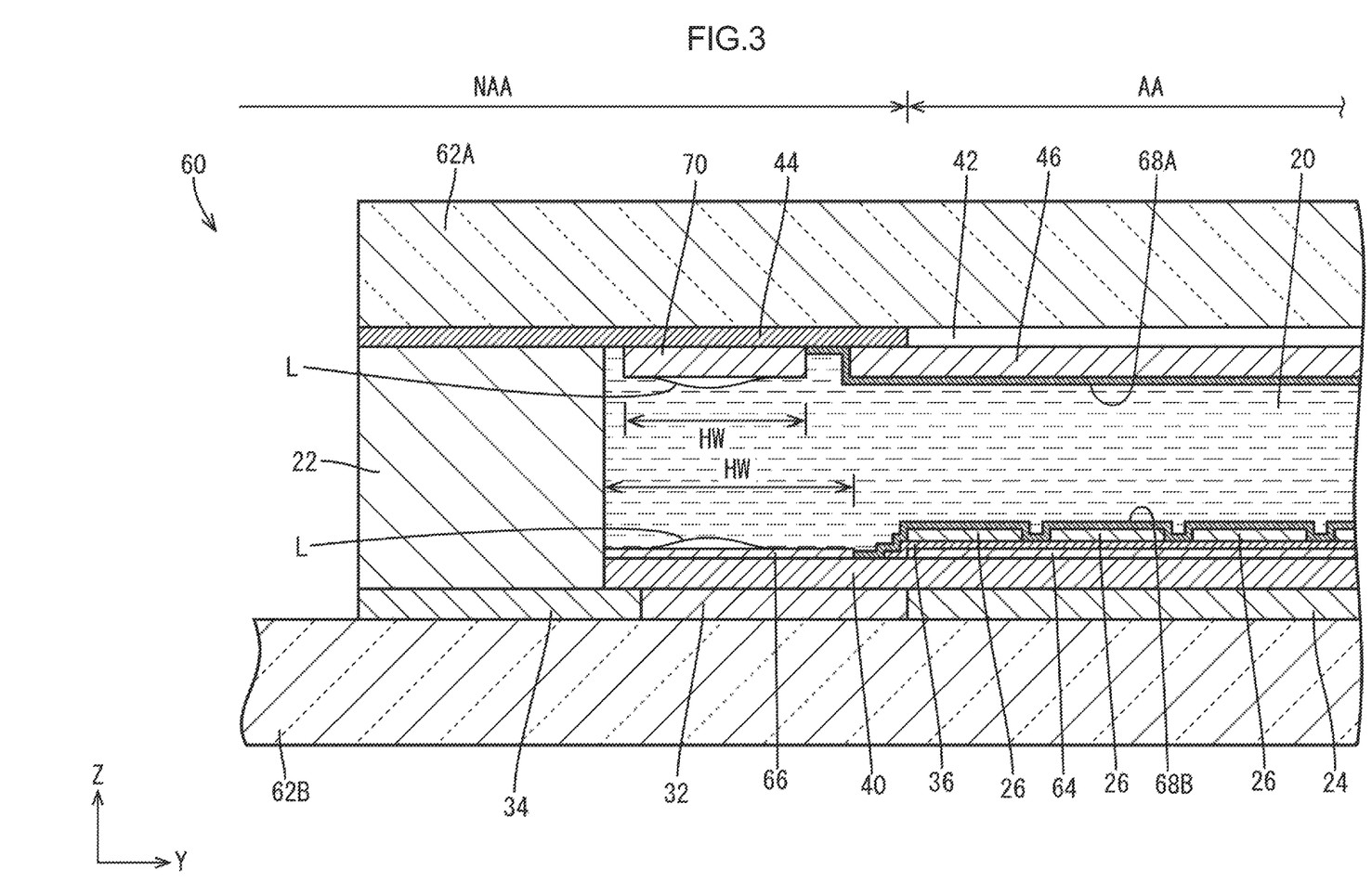
FIG. 3 is a cross-sectional view of a liquid crystal panel according to a second embodiment.

FIG. 3 shows a cross-section of a liquid crystal panel 60 according to a second embodiment. Since the liquid crystal panel 60 according to the second embodiment is substantially identical in configuration to the liquid crystal panel 10 according to the first embodiment, constituent elements which are identical to those of the liquid crystal panel 10 according to the first embodiment are given the same signs and are not described below. Since the liquid crystal panel 60 according to the second embodiment includes a pair of substrates 62 that are different from the pair of substrates 12 of the liquid crystal panel 10 according to the first embodiment, the following describes cross-section structures of the pair of substrates 62, namely a CF substrate 62A and an array substrate 62B, in detail.

As with the array substrate 12B according to the first embodiment, the array substrate 62B according to the second embodiment is structured such that the pixel circuit section 24, the peripheral circuit section 32, and the wire connection section 34 are disposed to face an inner surface of the array substrate 62B and that the insulating film 40 is provided over the pixel circuit section 24, the peripheral circuit section 32, and the wire connection section 34 in substantially solid fashion over the entire range of the inner part surrounded by the sealant 22. Note, however, that a common electrode 64 formed over the insulating film 40 is disposed only in the display area AA, and in the step of forming an IZO film to become the common electrode 64, an IZO film 66 is formed in the non-display area NAA simultaneously with the common electrode 64 but separately from the common electrode 64, for example, by a photolithographic method. That is, the IZO film 66 overlaps the peripheral circuit section 32, particularly a circuit of the peripheral circuit section 32 that includes a metal film.

Moreover, the interlayer insulating film 36, the pixel electrodes 26, and an array-side alignment film 68B are disposed in this order from below over the common electrode 64. The array-side alignment film 68B is confined to such a minimum range as to be able to cover the common electrode 64, the interlayer insulating film 36 and the pixel electrodes 26, and is not extended to the non-display area NAA. That is, the IZO film 66 is formed at the highest level between the outer edges of the array-side alignment film 68B and the sealant 22, and is in contact with the liquid crystal layer 20. Therefore, the IZO film 66 functions as a high wettability section HW. Since, as mentioned above, the IZO film 66 is a transparent conductive film made of the same material as the common electrode 64 and is formed simultaneously with the common electrode 64, there is no need to a new step to form the high wettability section HW, so that the high wettability section HW is easily formed. Further, since the adsorptive function of the IZO film 66 functioning as the high wettability section HW is potential-independent, there is no need to apply a voltage, so that the IZO film 66 can be electrically independent of the common electrode 64. In a case where the IZO film 66 is electrically independent, it is possible to suppress a rise in additional capacitance between the peripheral circuit section 32 disposed under the IZO film 66 and the common electrode 64.

Further, the second embodiment and the first embodiment may be carried out in combination. That is, such a configuration is possible that a partially electrically independent transparent conductive film is provided between the outer edges of the array-side alignment film 68B and the sealant 22 and the common electrode is exposed to the liquid crystal layer in a remaining part. For example, the second embodiment may be applied to a part of the peripheral circuit section 32 in which a rise in parasitic capacitance is particularly not desirable (such as a clock wire that is connected to the circuit that supplies signals to the gate wires), and the first embodiment may be applied to the other part.

Further, as with the CF substrate 12A according to the first embodiment, the CF substrate 62A according to the second embodiment is structured such that the color filter 42 and the light-shielding section 44 are disposed, that the overcoat film 46 is disposed over the color filter 42 and the light-shielding section 44, and that a CF-side alignment film 68A covering the overcoat film 46 is disposed over the overcoat film 46. Note, however, that the CF-side alignment film 68A is confined to such a minimum range as to be able to cover the overcoat film 46. Moreover, a metal film 70 made of the same material as the wires is disposed over the light-shielding section 44 between the outer edges of the CF-side alignment film 68A and the sealant 22. The metal film 70 is formed at the highest level between the outer edges of the CF-side alignment film 68A and the sealant 22, and is in contact with the liquid crystal layer 20. Therefore, the metal film 70 too functions as a high wettability section HW.

As noted above, in the liquid crystal panel 60 according to the second embodiment, the CF substrate 62A and the array substrate 62B are both provided with high wettability sections HW. This makes it possible to adsorb more of the liquid substance L and makes it possible to effectively prevent the liquid substance L from penetrating into the display area AA. In the second embodiment, the CF substrate 62A is provided with the metal film 70 as a high wettability section. Alternatively, the CF substrate 62A may be provided with a transparent conductive film of ITO, IZO, or the like. No voltage needs to be applied to the metal film 70, and in this case, no electric field from the metal film 70 will disrupt the orientation of liquid crystals by spreading into the display area AA. Further, a voltage may be applied to the metal film 70 to such an extent that an electric field from the metal film 70 does not disrupt the orientation of liquid crystals in the display area AA.

Third Embodiment

Figure 4:
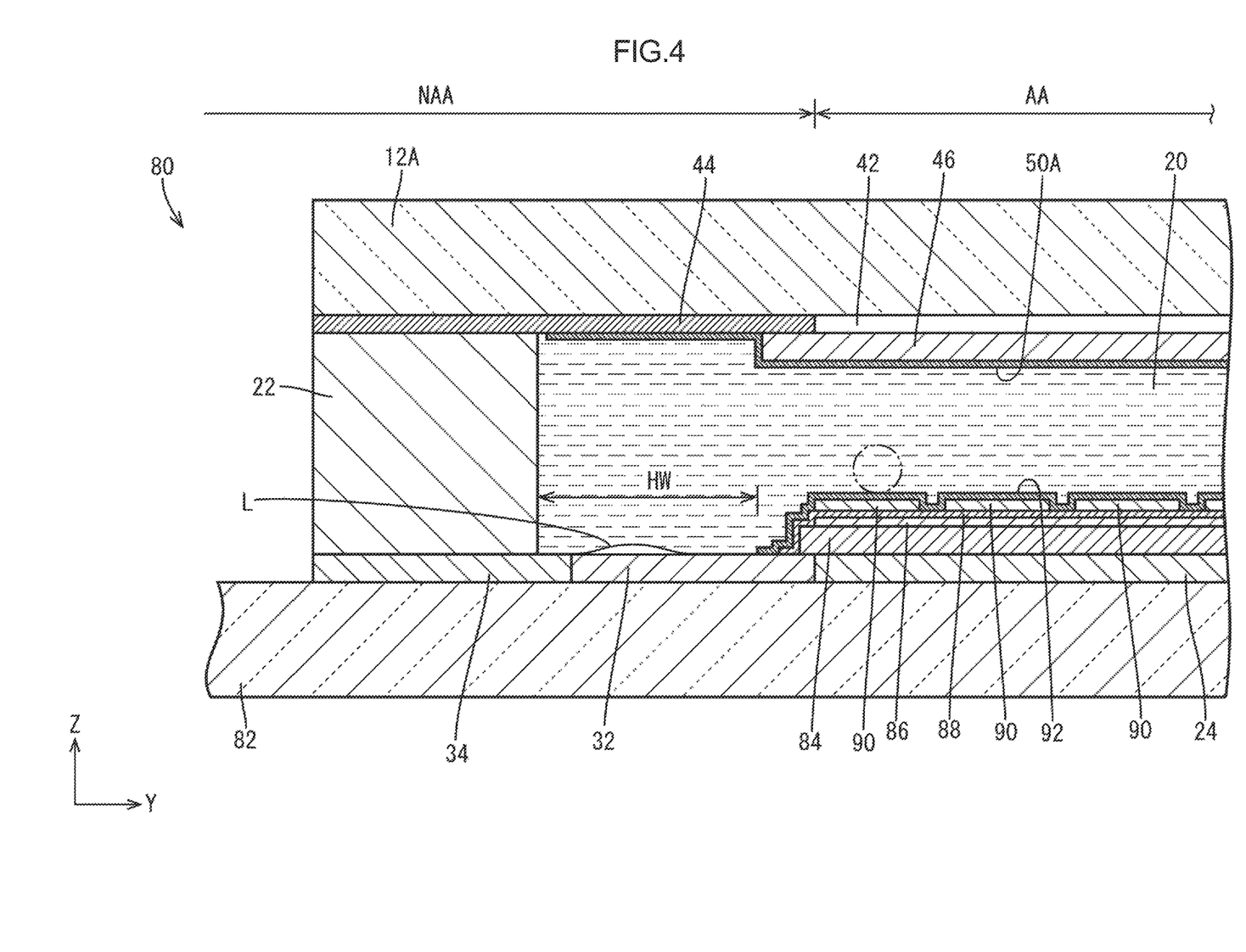
FIG. 4 is a cross-sectional view of a liquid crystal panel according to a third embodiment.

FIG. 4 shows a cross-section of a liquid crystal panel 80 according to a third embodiment. Since the liquid crystal panel 80 according to the third embodiment is substantially identical in configuration to the liquid crystal panel 10 according to the first embodiment, constituent elements which are identical to those of the liquid crystal panel 10 according to the first embodiment are given the same signs and are not described below. Since the liquid crystal panel 80 according to the third embodiment includes an array substrate 82 that is different from the array substrate 12B of the liquid crystal panel 10 according to the first embodiment, the following describes a cross-section structure of the array substrate 82 in detail.

As with the array substrate 12B according to the first embodiment, the array substrate 82 according to the third embodiment is structured such that the pixel circuit section 24, the peripheral circuit section 32, and the wire connection section 34 are disposed to face an inner surface of the array substrate 82. Moreover, an insulating film 84, a common electrode 86, an interlayer insulating film 88, pixel electrodes 90, and an array-side alignment film 92 are stacked in the same order from below as the array substrate 12B according to the first embodiment. Note, however, that the array substrate 82 according to the third embodiment is different from the array substrate 12B according to the first embodiment in terms of the ranges of formation of the insulating film 84 and the common electrode 86. Specifically, in the array substrate 82 according to the third embodiment, the insulating layer 84 is formed only in such a minimum range as to be able to cover the display area AA, i.e. to cover the pixel circuit section 24, and the common electrode 86 disposed over the insulating film 84 too is formed only in the display area AA. The interlayer insulating film 88 over the common electrode 86 is formed only in such a minimum range as to be able to cover the insulating film 84 and the common electrode 86. Further, the array-side alignment film 92 is formed only in such a minimum range as to be able to cover the insulating film 84, the common electrode 86, the interlayer insulating film 88, and the pixel electrodes 90 disposed, over the insulating film 84, the common electrode 86, and the interlayer insulating film 88.

That is, in the liquid crystal panel 80 according to the third embodiment, the peripheral circuit section 32 and the wire connection section 34 are formed at the highest level between the outer edges of the array-side alignment film 92 and the sealant 22, and are in contact with the liquid crystal layer 20. Moreover, the peripheral circuit section 32 and the wire connection section 34 are composed of metal films the highest ones of which are in contact with the liquid crystal layer 20. Therefore, parts of the peripheral circuit section 32 and the wire connection section 34 that extend from the outer edges of the array-side alignment film 92 to the inner sides of the sealant 22 function as a high wettability section HW. Since a process for manufacturing the liquid crystal panel 80 is only different from a process for manufacturing a conventional liquid crystal panel in terms of the ranges of formation of the upper layers of the peripheral circuit section 32 and the wire connection section 34, it is possible to easily form the high wettability section HW. Incidentally, since the wettability of the high wettability section HW is independent of the potentials of the peripheral circuit section 32 and the wire connection section 34, the high wettability section HW can adsorb the liquid substance L without any difficulty. The peripheral circuit section 32 and the wire connection section 34 are composed of metal films that function as the high wettability section HW by making contact with the liquid crystal layer 20. Alternatively, the metal films may be covered with a transparent conductive film of IZO or the like that may be brought into contact with the liquid crystal layer 20 to function as a high wettability section HW.

Fourth Embodiment

Figure 5:
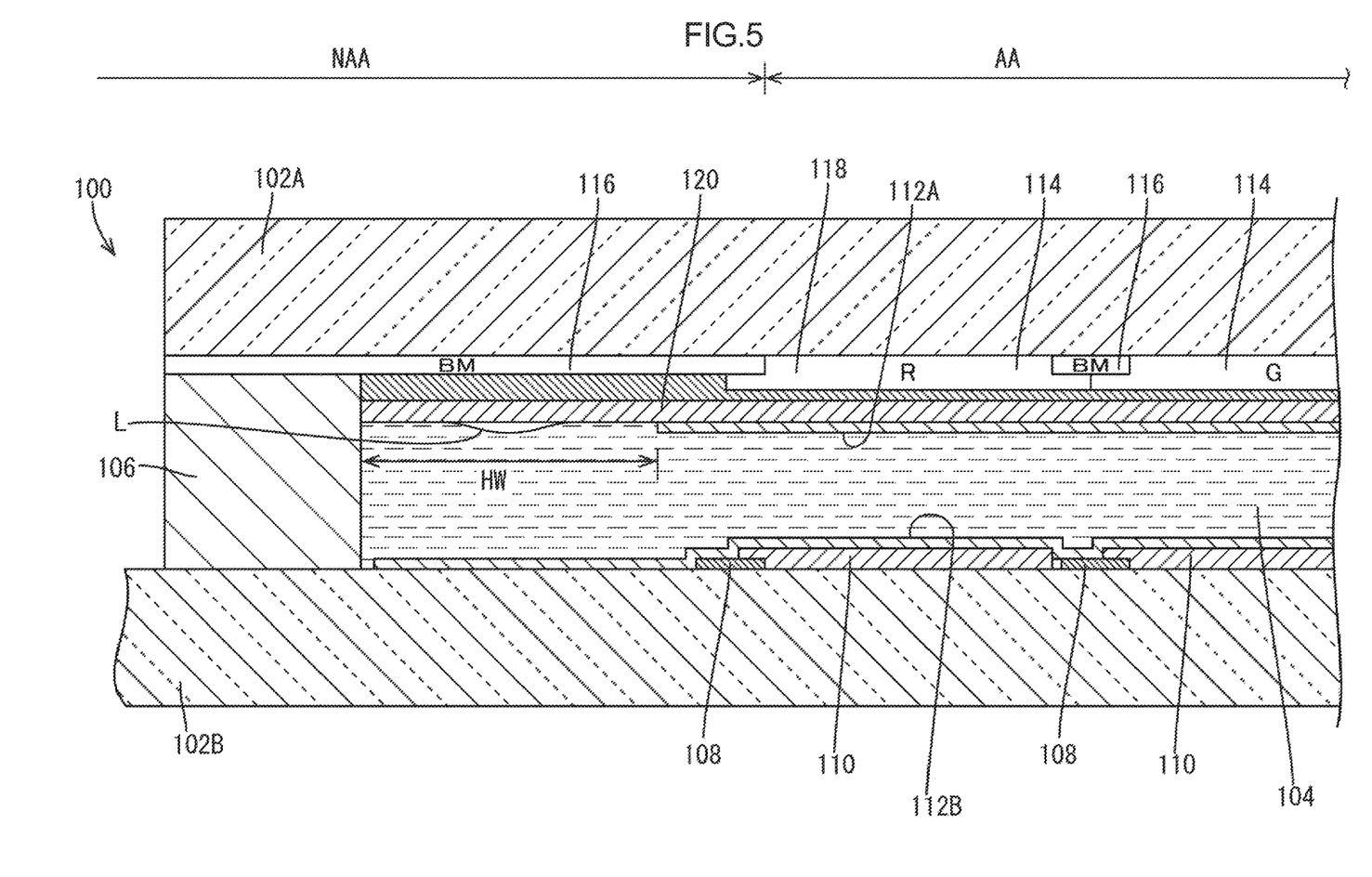
FIG. 5 is a cross-sectional view of a liquid crystal panel according to a fourth embodiment.

FIG. 5 shows a cross-section of a liquid crystal panel 100 according to a fourth embodiment. The liquid crystal panel 100 includes a pair of substrates 102, a liquid crystal layer 104 disposed between the two substrates 102, and a sealant 106, provided at peripheral edges of the pair of substrates 102, that seals in the liquid crystal layer 104. While the liquid crystal panel 10 according to the first embodiment is in an FFS mode, the liquid crystal panel 100 according to the fourth embodiment is in an TN or VA mode in which the liquid crystal molecules are controlled with the liquid crystal layer 104 sandwiched between electrodes disposed on both of the two substrates 102.

Of the two substrates 102, an array substrate 102B disposed at the back includes TFTs 108 serving as switching elements connected to gate wires and source wires that are orthogonal to each other and pixel electrodes 110 connected to the TFTs 108, and a large number of these TFTs 108 and a large number of these pixel electrodes 110 are arranged in a matrix. Moreover, an array-side alignment film 112B is provided in solid fashion over substantially the entire range within a sealant 106 so as to cover the TFTs 108 and the pixel electrodes 110.

Meanwhile, as with the CF substrate 12A according to the first embodiment, a CF substrate (counter substrate) 102A disposed at the front includes a color filter 114 having a predetermined arrangement of colored portions such as R (red), G (green), and B (blue) portions, a light-shielding section (black matrix) 116 that partitions adjacent colored portions from each other, and an overcoat film 118 covering the color filter 114 and the light-shielding section 116. The overcoat film 118 is provided in substantially solid fashion over the entire range of an inner part of the CF substrate 102A surrounded by the sealant 106.

A common electrode (counter electrode) 120 including a transparent conductive film of ITO, IZO, or the like is disposed over the overcoat film 118 of the CF substrate 102A according to the fourth embodiment. Note here that the common electrode 120 is made of ITO. The common electrode 120 is so provided in substantially solid fashion over the entire range of an inner part surrounded by the sealant 106 as to cover the overcoat film 118. Meanwhile, a CF-side alignment film 112A is disposed over the common electrode 120. The CF-side alignment film 112A is confined to such a minimum range as to be able to cover the display area AA, and is not extended to the non-display area NAA. That is, the common electrode 120 is configured to make contact with the liquid crystal layer 104 in a range from the outer edges of the CF-side alignment substrate 112A to the inner sides of the sealant 106. Therefore, a part of the common electrode 120 that extends from the outer edges of the CF-side alignment film 112A to the inner sides of the sealant 106 (i.e. the hatching region in FIG. 1) functions as a high wettability section HW.

Since a process for manufacturing the liquid crystal panel 100 according to the fourth embodiment is only different from a process for manufacturing a conventional liquid crystal panel in terms of the ranges of formation of the common electrode 120 and the CF-side alignment film 112A of the CF substrate 102A, it is possible to easily form the high wettability section HW.

It should be noted that in each of the embodiments, the overcoat film is not necessarily an essential component.

The invention claimed is:

1. A liquid crystal panel comprising:
   a pair of substrates;
   a liquid crystal layer disposed between the substrates; and
   a sealant disposed at edges of the substrates to seal the liquid crystal layer,
   wherein at least one of the substrates includes:

an alignment film for aligning liquid crystal molecules in the liquid crystal layer;

a high wettability section in contact with the liquid crystal layer between outer edges of the alignment film and the sealant, the high wettability section having wettability greater than wettability of the alignment film, a circuit section including a metal film disposed in a non-display area around a display area;

wherein the high wettability section overlaps at least a part of the circuit section, and wherein the high wettability section is potential-independent.

2. The liquid crystal panel according to claim 1, wherein at least one of the substrates includes a transparent conductive film or a metal film disposed on an uppermost layer between the outer edges of the alignment film and the sealant and configured to function as the high wettability section.

3. The liquid crystal panel according to claim 1, wherein at least one of the substrates includes an electrode film disposed under the alignment film, the electrode film extends beyond the outer edges of the alignment film to an inner periphery of the sealant, and the electrode film includes a peripheral section that is not covered with the alignment film and configured as the high wettability section.

4. The liquid crystal panel according to claim 1, wherein at least one of the substrates includes an electrode disposed under the alignment film, and the high wettability section is made of a material identical to a material of the electrode and is separated from the electrode.

5. The liquid crystal panel according to claim 1, wherein at least one of the substrates includes a circuit section including a metal film disposed in a non-display area around a display area, and at least a section of the circuit section is in contact with the liquid crystal layer and configured as the high wettability section.

6. The liquid crystal panel according to claim 1, wherein one of the substrates is an array substrate including a plurality of switching elements, a plurality of pixel electrodes connected to the plurality of switching elements, respectively, and a common electrode opposed to the plurality of pixel electrodes, and the array substrate includes the high wettability section.

7. The liquid crystal panel according to claim 1, wherein one of the substrates is an array substrate including a plurality of switching elements and a plurality of pixel electrodes connected to the plurality of switching elements, respectively, and another one of the substrates is a counter substrate including a common electrode opposed to the plurality of pixel electrodes.

8. The liquid crystal panel according to claim 1, wherein the alignment film is made of an organic material.

9. The liquid crystal panel according to claim 1, wherein the high wettability section extends for the entire periphery of the sealant.

\* \* \* \* \*